US005244521A

United States Patent [19]

Ligman

[11] Patent Number: 5,244,521

[45] Date of Patent: Sep. 14, 1993

[54] PNEUMATIC TOOL MUFFLER SYSTEM

[76] Inventor: Gary A. Ligman, 310 Mill Rd., Martinez, Calif. 94553

[21] Appl. No.: 929,424

[22] Filed: Aug. 14, 1992

Related U.S. Application Data

[62] Division of Ser. No. 708,247, May 31, 1991, Pat. No. 5,189,267.

[51] Int. Cl.[5] ................................ B32B 31/26

[52] U.S. Cl. ................................ 156/85; 156/86; 156/87; 264/230; 264/342 R; 181/198; 181/230; 181/296

[58] Field of Search ................................ 156/85, 86, 87; 264/230, 342 R; 181/198, 207, 217, 222, 230, 252, 256, 296

[56] References Cited

U.S. PATENT DOCUMENTS

| | | | |
|---|---|---|---|
| 3,225,861 | 12/1965 | Reynolds | 181/230 |
| 3,379,278 | 4/1968 | Skowron | 181/230 |
| 3,567,259 | 3/1971 | Benson et al. | 264/230 |
| 3,918,530 | 11/1975 | Nyholm | 181/230 |
| 4,068,742 | 1/1978 | Resare | 181/230 |
| 4,759,811 | 7/1988 | Jensen et al. | 156/86 |
| 4,860,851 | 8/1989 | Krevor et al. | 181/296 |

*Primary Examiner*—Caleb Weston
*Attorney, Agent, or Firm*—Thomas R. Lampe

[57] ABSTRACT

Heat shrink tubing is disposed about a pneumatic tool and heat shrunk into position on the tool. Foraminous material is located between the tubing and tool in a restricted fluid-flow passageway extending between a tool air flow outlet and an end of the heat shrunk tubing.

5 Claims, 2 Drawing Sheets

14
10
22
34
12
32
N
16
50
36
20

12
22
14
10
18
26
16
50
34
32
36
40

PNEUMATIC TOOL MUFFLER SYSTEM

This is a division of application Ser. No. 07/708,247 filed May 31, 1991 U.S. Pat. No. 5,189,267.

TECHNICAL FIELD

This invention relates to pneumatic tools, such as air ratchets, and more particularly, to a muffler system for modifying the noise characteristics of air exhausted from the tool during operation thereof. The invention relates to muffler apparatus as well as to a method of muffling the pneumatic tool.

BACKGROUND ART

U.S. Pat. No. 3,379,278, issued Apr. 23, 1968, discloses a muffler for use on a pneumatic tool such as a grinder. An open-ended sleeve of an elastic, resilient material is tightly fitted over the body portion and exhaust ports of the tool, being bonded to the body portion. Spent air exhausted from the tool forces the sleeve away from the tool and escapes at the end of the sleeve. A band of non-elastic material is placed around the body of the tool closely adjacent the exhaust ports in the opposite direction from the end of the sleeve through which the air escapes. This band is secured to the sleeve and prevents air from forcing the sleeve away from the body portion of the tool.

U.S. Pat. No. 3,993,159, issued Nov. 23, 1976, discloses a muffler for reducing the noise level of the air exhaust from a governed pneumatic tool. The muffler, which is formed of plastic or metal, is secured to the tool housing by screws and forms an enclosed cavity extending about the exhaust apertures of the tool. A foraminous baffle plate, which in the disclosed embodiment is a thin brass screen, is located within the cup-shaped body of the muffler.

U.S. Pat. No. 4,496,023, issued Jan. 29, 1985, discloses a plastic silencer surrounding a compressed air tool in the form of a pneumatically operated impact tool. The silencer forms an exhaust chamber about the tool. Two exhaust tubes project from the chamber and holes are drilled near the inlet ends of the tubes to prevent ice build up.

U.S. Pat. No. 3,255,844, issued Jun. 14, 1966, discloses a multi-passage silencer for pneumatic tools of the percussion type. The silencer is specifically adapted to and devised for permanent attachment to a tool of that type.

U.S. Pat. No. 3,719,251, issued Mar. 6, 1973, relates to a diffuser for employment with portable pneumatic tools such as a dentist drill to disperse exhausted air.

A search directed to the present invention also located the following U.S. Pat. Nos.: 4,367,807, issued Jan. 11, 1983, 3,447,630, issued Jun. 3, 1969, 2,019,697, issued Nov. 5, 1935, and 2,996,139, issued Aug. 15, 1961.

DISCLOSURE OF INVENTION

In common with the arrangements shown in the above-identified patents, the present invention relates to apparatus for muffling air or other gases exhausted from equipment. The present invention is particularly adapted for use with a pneumatic tool and the muffler apparatus disclosed herein is characterized by its relative simplicity and low cost as compared to prior art arrangements. The muffler apparatus is readily retrofitted on pneumatic tools such as air ratchets or the like and such apparatus is so configured and constructed that it can be readily and quickly applied to the tool. Furthermore, the muffler apparatus can be affixed to a wide variety of pneumatic tool constructions; essentially, one size of the muffler apparatus fits virtually all conventional hand held pneumatic tools such as air ratchets regardless of their peculiarities of construction.

Once installed, the muffler apparatus of the present invention is quite compact and does not interfere with use of the pneumatic tool to which it has been attached, nor does the muffler apparatus significantly add to the weight of the tool.

The muffler apparatus not only serves to reduce the noise level of the pneumatic tool, it performs other desirable functions as well. For example, the muffler apparatus acts as a convenient insulated handle for the operator. In addition, the pressurized air being exhausted from the tool is directed away from the user from a location spaced from the user further than the location of the tool air flow outlet.

The fact that the muffler apparatus of the present invention can be readily and quickly retrofitted on air ratchets and other similar pneumatic tools is a highly desirable attribute. Unmuffled tools can, over time, cause significant damage to the hearing of persons employing such equipment. It is an unfortunate fact that workers will risk such damage rather than use muffled tools which are bulky or in some other way interfere with ease of operation of the pneumatic tool. The present apparatus will not in any significant way hinder or impede normal pneumatic tool use. In fact, such use is, if anything, facilitated.

The muffler apparatus of the present invention is employed in combination with a pneumatic tool including a first body portion and a second body portion connected to the first body portion. The pneumatic tool defines an air flow outlet at the juncture of the first and second body portions. The muffler apparatus modifies the noise characteristics of air exhausted from the air flow outlet during operation of the pneumatic tool.

The muffler apparatus comprises heat shrunk tubing having first and second ends and disposed about the first and second body portions. The heat shrunk tubing forms a seal with the first body portion substantially preventing flow of pressurized air from the air flow outlet out the first end of the heat shrunk tubing. The heat shrunk tubing defines a restricted fluid-flow passageway with the second body portion, the passageway leading from the air flow outlet to the second end of the heat shrunk tubing The first body portion of the pneumatic tool has an outer peripheral surface at the juncture of greater magnitude than the outer peripheral surface of the second body portion. The air flow outlet directs pressurized air from the first body portion and toward the second body portion. The heat shrunk tubing generally conforms in shape to and is in engagement with the outer peripheral surfaces of the first and second body portions except at the location of the fluid-flow passageway.

Foraminous material is disposed in the fluid-flow passageway through which pressurized air from the air flow outlet passes prior to the pressurized air exiting from the heat shrunk tubing second end. The foraminous material is compressed between the second body portion and the heat shrunk tubing. A particularly desirable form of foraminous material is a non-woven fibrous material such as nylon fibers. Preferably, adhesive is employed to bond the first and second body portions and the heat shrunk tubing.

The present invention also encompasses a method of muffling a pneumatic tool of the afore-described type which includes the step of inserting the pneumatic tool in heat shrinkable tubing having opposed ends. The heat shrinkable tubing is then positioned relative to the pneumatic tool so that the heat shrinkable tubing surrounds the juncture of the first and second body portions.

The next step is heat shrinking the heat shrinkable tubing by applying heat thereto. Heat shrinking is continued until the tubing is shrunk and in tight engagement with the first body portion about the periphery of the first body portion and forms a substantially fluid-tight seal therewith. The tubing is also shrunk into tight engagement with the second body portion.

During the heat shrinking step, a space is maintained between the tubing and a preselected area of the second body portion to define a fluid-flow passageway leading from the air flow outlet and an end of the tubing located at the second body portion.

Other features, advantages, and objects of the present invention will become apparent with reference to the following description and the accompanying drawings.

BEST MODE FOR CARRYING OUT THE INVENTION

Figures 1, 2:
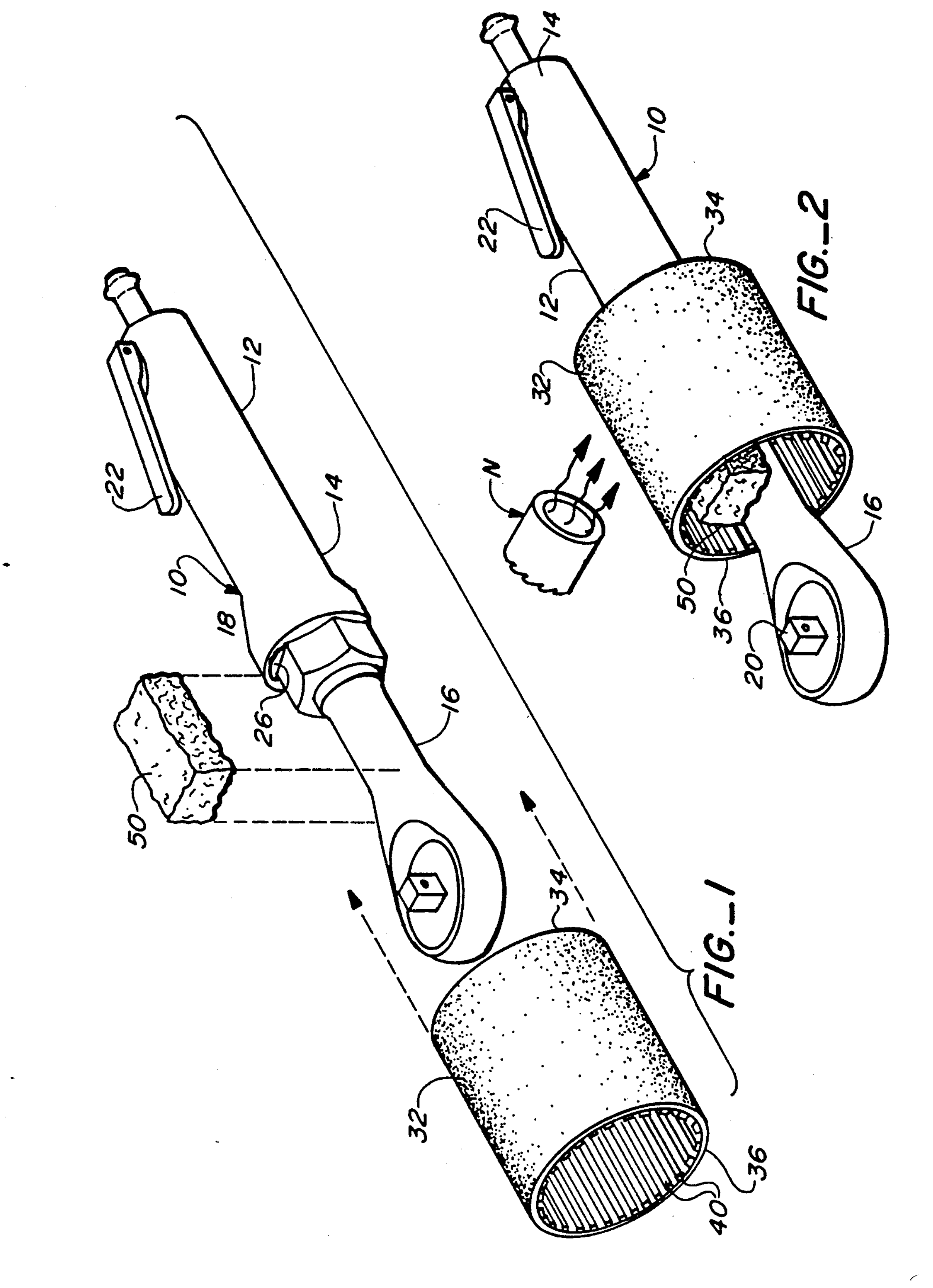
FIG. 1 is an exploded, perspective view illustrating components of a preferred form of the muffler apparatus of the present invention prior to assembly of the muffler apparatus on a pressurized air operated ratchet.
FIG. 2 is a perspective view illustrating the muffler apparatus heat shrinkable tubing disposed about the ratchet and being heat shrunk in position.

Referring now to the drawings, a pneumatic tool in the form of a pressurized air operated ratchet is designated by reference numeral 10. Ratchet 10 is of conventional construction and includes a body 12 comprised of first body portion 14 and second body portion 16, said body portions being connected together at a junction 18. A rotatable tool element 20 is mounted at the distal end of the second body portion 16, rotation of the tool element being effected by suitable conventional compressed air powered drive mechanism (not shown) disposed within the interior of the air ratchet. Compressed air enters the distal end of the first body portion 14 upon actuation by an operator of handle 22.

First body portion 14 has a outer peripheral surface at juncture 18 of greater magnitude than the outer peripheral surface of the second body portion. Pressurized air entering the first body portion exhausts therefrom through an air flow outlet 26. The pressurized air is directed by the air flow outlet from the first body portion and toward the second body portion.

The air ratchet 10 just described is per se of well known construction and tools of this type are in widespread usage. All such tools are characterized by their loud noise during use, such noise being in large measure a result of the pressurized air exiting the air flow outlet. The noise is characterized not only by a high decibel measurement but by a particularly aggravating and potentially harmful high pitch component.

The muffler apparatus of the present invention is generally designated by reference numeral 30. The apparatus includes a length of tubing 32 having a first end 34 and a second end 36. The tubing, which is formed of heat shrinkable material, is disposed about the first and second body portions 14, 16 of the tool. One suitable tubing material is heat shrink polyolefin tubing such as that made available by Ico-Rally Corporation, Palo Alto, Calif. Heat shrink tubing which is designated Heavy Wall by that company and which has a three to one shrink ratio (Part number HW3X-20-) has been found to be suitable for the present application. This product can be obtained coated internally with a sealant or adhesive in the form of a thermally activated mastic and it is preferred that such an adhesive be utilized. In the embodiment illustrated, the adhesive 40 is in the form of elongated ribs applied to the inner surface of the tubing but it should be appreciated that the entire surface could be adhesive coated. This complete coverage will occur in any event when adhesive ribs 40 are subjected to heat and adhesive flow occurs.

Figure 5:
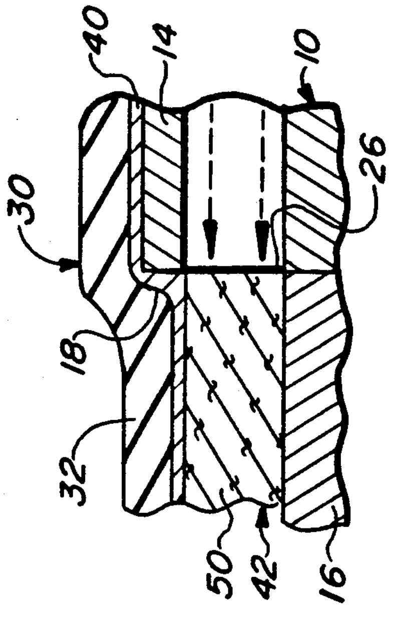
FIG. 5 is an enlarged, cross-sectional view taken along line 5—5 in FIG. 4.
Figure 3:
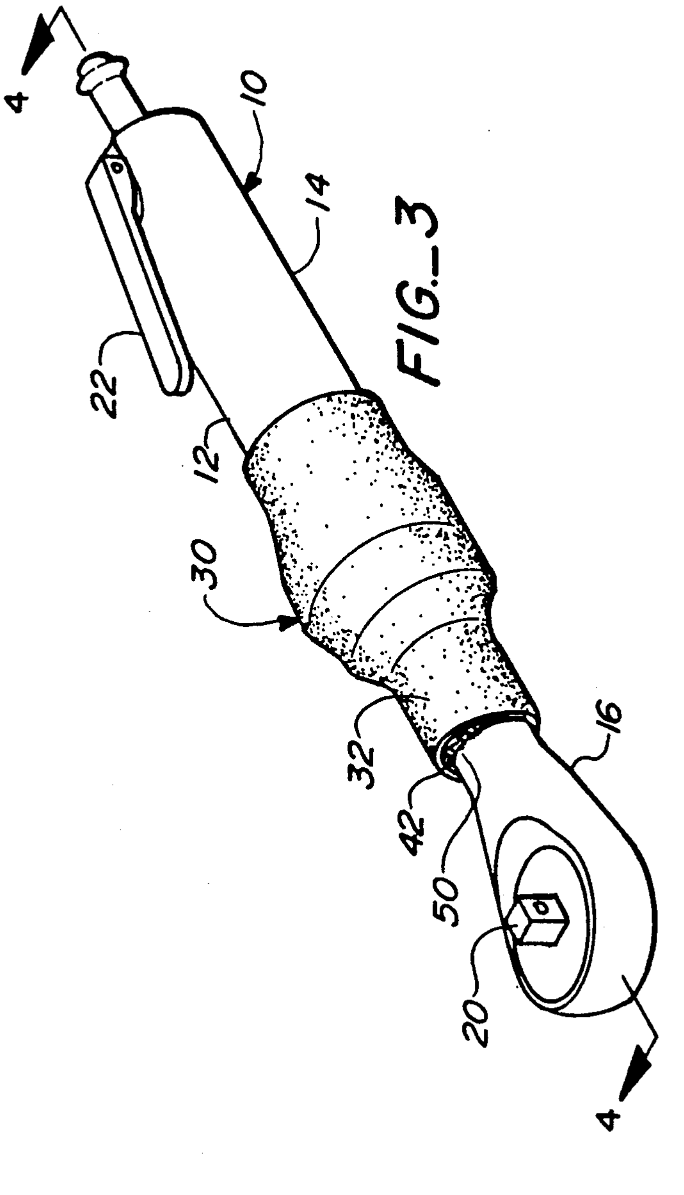
FIG. 3 is a perspective view of the muffler apparatus installed on the ratchet.
Figure 4:
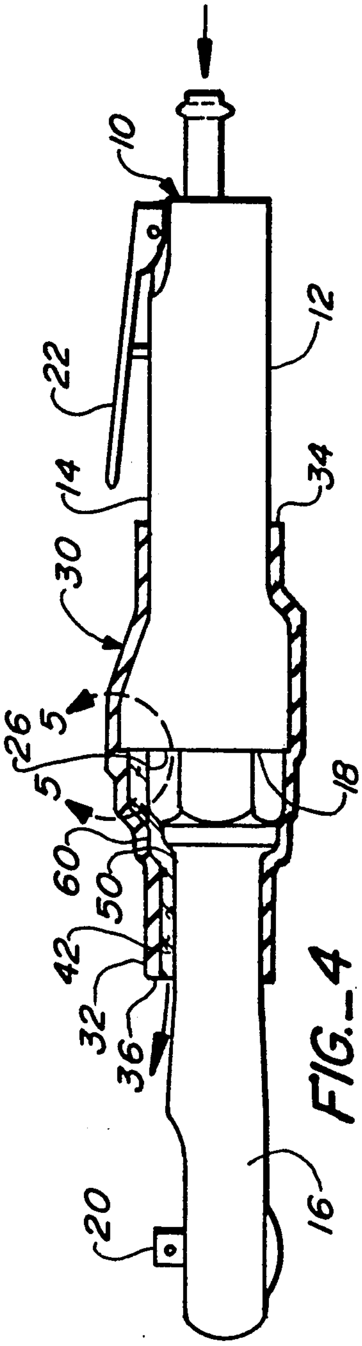
FIG. 4 is a side view of the ratchet and a muffler apparatus with the muffler apparatus in cross-section taken along the line 4—4 in FIG. 3.

When shrunk into place as shown in FIGS. 3, 4 and 5, the heat shrunk tubing 32 forms a seal with the first body portion 14 about the entire periphery thereof preventing flow of pressurized air from the air flow outlet 26 out the first end 34 of the tubing. Furthermore, the heat shrunk tubing defines along with the second body portion 16 a restricted fluid-flow passageway 42. Passageway 42 leads from the air flow outlet 26 to the second end 36 of the heat shrunk tubing. The heat shrunk tubing generally-conforms-in shape-to-and is-in adhesive engagement with the outer peripheral surfaces of the first and second body portions except at the location of the fluid-flow passageway.

Foraminous material 50 is disposed in the fluid-flow passageway 42 through which pressurized air from the air flow outlet 26 passes prior to the pressurized air exiting from the heat shrunk tubing second end. The foraminous material is compressed between the second body portion and the heat shrunk tubing. In the illustrated preferred embodiment, foraminous material 50 is a non-woven fibrous material and, even more specifically, non-woven fibrous material comprising nylon fibers disposed between the second body portion and the heat shrunk tubing. The fibers may be in the form of a pre-manufactured pad, one suitable commercially available example being the Heavy Duty Stripping Pad (Catalog No. 10111) made available by 3M Consumer Products Group, St. Paul, Min. The adhesive 40 assists in maintaining the foraminous material 50 in place.

When actuation of handle 22 allows the entry of pressurized air into the interior of first body portion 14, such air exits the air flow outlet 26 and proceeds along passageway 42 through the foraminous material 50. A certain amount of pressurized air back-pressure is built up at the air flow outlet 26 but the back-pressure does not appreciably affect the performance of the tool.

The foraminous material 50 creates turbulence in the air passing therethrough, in effect breaking up the air flow into a myriad of interconnecting paths. This action serves to lower the volume of the noise caused by operation of the tool.

With reference to FIG. 4, it will be noted that the second body portion 16 and the heat shrunk tubing 32 cooperate to form a bend 60 in the fluid-flow passageway 42 whereby pressurized air passing through the foraminous material obliquely impacts a segment of the outer peripheral surface of the second body portion. It has been found that this deflection of the pressurized air flow greatly reduces the level of the higher pitched noise components of the pressurized air being exhausted. The layer of adhesive 40 on the inside of the heat shrinkable tubing also will contribute to the sound absorption capabilities of the invention, particularly when the adhesive has a relatively soft texture.

FIGS. 1 and 2 illustrate the initial steps of the method of muffling a pneumatic tool according to the teachings of the present invention. The ratchet or pneumatic tool 10 is first inserted in heat shrinkable tubing 32 which has not yet been shrunk. The tubing and the pneumatic tool are relatively positioned so that the heat shrinkable tubing surrounds the juncture of the first and second body portions of the tool as shown in FIG. 2. A pad or other mass of foraminous material 50 is then positioned between the tubing and the tool second body portion so that the foraminous material is located at a preselected area of the second body portion leading from the air flow outlet 26 of the pneumatic tool to the second end 36 of the tubing. The heat shrinkable tubing is then shrunk by applying heat thereto as by means of a heated air gun nozzle N as shown in FIG. 2. Heat shrinking is continued until the tubing 32 is shrunk and in tight engagement with the first body portion 14 about the periphery of the first body portion and forms a substantially fluid-tight seal therewith. The tubing is also shrunk and in tight engagement with the second body portion except for the preselected are accommodating the foraminous material.

Thus, a space is maintained between the tubing and the preselected are of the second body portion to define the fluid-flow passageway 42 leading from the air flow outlet and the end of the tubing located at the second body portion.

During heat shrinking of the tubing surrounding the second body portion, the foraminous material is compressed between the tubing and the second body portion. According to the preferred embodiment of the method, the tubing is adhesively secured to the first and second body portions of the tool. This step is carried out by disposing adhesive 40 between the tubing and the first and second body portions prior to the heat shrinking step and squeezing the adhesive between the tubing and the first and second body portions. Upon cooling, the adhesive will form a tight bond between the tubing, the foraminous material, and the tool to prevent relative movement therebetween during use of the muffled tool.

What is claimed is:

1. A method of muffling a pneumatic tool including a first body portion and a second body portion connected to said first body portion, said pneumatic tool defining an air flow outlet at a juncture of said first and second body portions, said method comprising the steps of:

inserting said pneumatic tool in heat shrinkable tubing having opposed ends;

positioning said heat shrinkable tubing relative to said pneumatic tool so that said heat shrinkable tubing surrounds the juncture of said first and second body portions;

heat shrinking said heat shrinkable tubing by applying heat thereto;

continuing said heat shrinking until said tubing is shrunk and in tight engagement with said first body portion about the periphery of said first body portion and forms a substantially fluid-tight seal therewith and in tight engagement with said second body portion; and during said heat shrinking, maintaining a space between said tubing and a preselected area of said second body portion by preventing engagement between said tubing and said preselected area during said heat shrinking to define a fluid-flow passageway leading roms id air flow outlet and an end of the tubing located at said second body portion.

2. The method according to claim 1 wherein the step of maintaining a space between the tubing and a preselected area of said second body portion comprises disposing foraminous material at said area prior to heat shrinking the tubing to tightly engage the tubing with said second body portion.

3. The method according to claim 2 including the step of compressing said foraminous material between said tubing and said second body portion while heat shrinking said tubing.

4. The method according to claim 2 including the step of adhesively securing said tubing to said first and second body portions.

5. The method according to claim 4 wherein said step of adhesively securing said tubing to said first and second body portions includes disposing an adhesive between said tubing and said first and second body portions prior to said heat shrinking step and squeezing said adhesive between said tubing and said first and second body portions.

* * * * *